United States Patent
Nara et al.

(10) Patent No.: US 8,928,584 B2
(45) Date of Patent: Jan. 6, 2015

(54) DISPLAY APPARATUS, DISPLAY METHOD, AND STORAGE MEDIUM

(75) Inventors: Katsuhiro Nara, Tokyo (JP); Hayato Ikezu, Tachikawa (JP); Daisuke Sugiura, Tokyo (JP); Yutaro Ichimura, Yokohama (JP)

(73) Assignee: Casio Computer Co., Ltd., Tokyo (JP)

( * ) Notice: Subject to any disclaimer, the term of this patent is extended or adjusted under 35 U.S.C. 154(b) by 199 days.

(21) Appl. No.: 13/567,238

(22) Filed: Aug. 6, 2012

(65) Prior Publication Data

US 2013/0038522 A1 Feb. 14, 2013

(30) Foreign Application Priority Data

Aug. 10, 2011 (JP) ................................. 2011-174478

(51) Int. Cl.
G09G 5/00 (2006.01)
G06F 3/033 (2013.01)
H04N 5/232 (2006.01)

(52) U.S. Cl.
CPC ....... *H04N 5/23293* (2013.01); *H04N 5/23222* (2013.01)
USPC ............... 345/156; 345/157; 345/158; 345/7; 348/169; 348/333.01; 348/333.02

(58) Field of Classification Search
USPC .......... 345/156–158, 169, 7–9; 348/169, 345, 348/333.01, 333.02, 333.04, 333.06; 455/566, 456.1; 701/400, 519, 523
See application file for complete search history.

(56) References Cited

U.S. PATENT DOCUMENTS

| 7,689,118 | B2 | 3/2010 | Tsujimoto |
| 8,397,181 | B2* | 3/2013 | Hartman et al. ............. 715/848 |
| 2007/0140683 | A1* | 6/2007 | Tsujimoto ..................... 396/374 |
| 2008/0273108 | A1* | 11/2008 | Tsutsumi ................. 348/333.01 |
| 2012/0088526 | A1* | 4/2012 | Lindner ........................ 455/457 |
| 2012/0194547 | A1* | 8/2012 | Johnson et al. ............... 345/632 |
| 2014/0028718 | A1* | 1/2014 | Lindner ........................ 345/633 |

FOREIGN PATENT DOCUMENTS

| JP | 04-47770 A | 2/1992 |
| JP | 05-110917 A | 4/1993 |
| JP | 08-184436 A | 7/1996 |
| JP | 2002-314851 A | 10/2002 |
| JP | 2006-203863 A | 8/2006 |

(Continued)

OTHER PUBLICATIONS

Japanese Office Action dated Nov. 19, 2013 (and English translation thereof) in counterpart Japanese Application No. 2011-174478.

*Primary Examiner* — Hong Zhou
(74) *Attorney, Agent, or Firm* — Holtz, Holtz, Goodman & Chick PC

(57) ABSTRACT

A display apparatus includes an image pickup section, a display section, an instruction section, a position specification section, a direction specification section, a specification section, and a reporting section. The image pickup section sequentially picks up an image. The display section displays the picked up image. The instruction section generates an instruction signal for marking an object included in the image. The position specification section specifies a position where the display apparatus exists. The direction specification section specifies a pickup direction by the image pickup section. The specification section specifies a position of the object relative to the position of the display apparatus based on the position of the display apparatus and the pickup direction in response to the instruction signal. The reporting section reports the position of the object.

12 Claims, 12 Drawing Sheets

(56) References Cited

FOREIGN PATENT DOCUMENTS

| JP | 2007-166463 A | 6/2007 |
| JP | 2009-111827 A | 5/2009 |
| JP | 2009-224890 A | 10/2009 |
| JP | 2010-004381 A | 1/2010 |
| JP | 2010-061265 A | 3/2010 |
| JP | 2010-123121 A | 6/2010 |

* cited by examiner

DISPLAY APPARATUS, DISPLAY METHOD, AND STORAGE MEDIUM

BACKGROUND OF THE INVENTION

1. Field of the Invention

The present invention relates to a display apparatus, a display method, and a storage medium.

2. Description of the Related Art

Conventionally, as disclosed by, for example, Japanese Patent Application Laid Open Publication No. 2009-224890, there is known an image pickup apparatus which accepts input of an instruction to mark an object included in a picked up image and specifies a positional relationship between the image pickup apparatus and the marked object. When the positional relationship changes and the marked object is out of an angular field of the image pickup apparatus, such an image pickup apparatus displays a guide indication on a display to indicate a direction in which the marked object exists.

In such a conventional image pickup apparatus, a user is required to use a touch panel on the image pickup apparatus to input an instruction signal for marking the object. Thus, specifying the object to be marked is troublesome for a user.

SUMMARY OF THE INVENTION

An object of the present invention is to provide a display apparatus, a display method and a storage medium which enable a user to easily specify an object to be marked.

To solve the above-mentioned problems, according to a first aspect of the present invention, there is provided a display apparatus that includes an image pickup section to sequentially pick up an image, a display section to display the image picked up by the image pickup section, an instruction section to generate an instruction signal for marking an object, which object being included in the image displayed by the display section and being displayed at a predetermined position of the display section, a position specification section to specify a position where the display apparatus exists, a direction specification section to specify a pickup direction of the image pickup section, a specification section to specify a position of the object relative to the position of the display apparatus based on the position of the display apparatus and the pickup direction in response to an input of the instruction signal from the instruction section, and a reporting section to report the position of the object.

To solve the above-mentioned problems, according to a second aspect of the present invention, there is provided a display method for a display apparatus including a display section to display an image sequentially picked up by an image pickup section, including the steps of generating an instruction signal for marking an object, which object being included in the image displayed by the display section and being displayed at a predetermined position of the display section, specifying a position where the display apparatus exists, specifying a pickup direction of the image pickup section, specifying a position of the object relative to the position of the display apparatus based on the position of the display apparatus and the pickup direction in response to an input of the instruction signal from the instruction section, and reporting the position of the object.

To solve the above-mentioned problems, according to a third aspect of the present invention, there is provided a computer-readable storage medium that stores a program for causing a computer, which is included in a display apparatus provided with a display section for displaying an image sequentially picked up by an image pickup section, to function as, an instruction section to generate an instruction signal for marking an object, which object being included in the image displayed by the display section and being displayed at a predetermined position of the display section, a position specification section to specify a position where the display apparatus exists, a direction specification section to specify a pickup direction of the image pickup section, a specification section to specify a position of the object relative to the position of the display apparatus based on the position of the display apparatus and the pickup direction in response to an input of the instruction signal from the instruction section, and a reporting section to report the position of the object.

According to the present invention, a user can easily specify an object to be marked.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Figure 1:
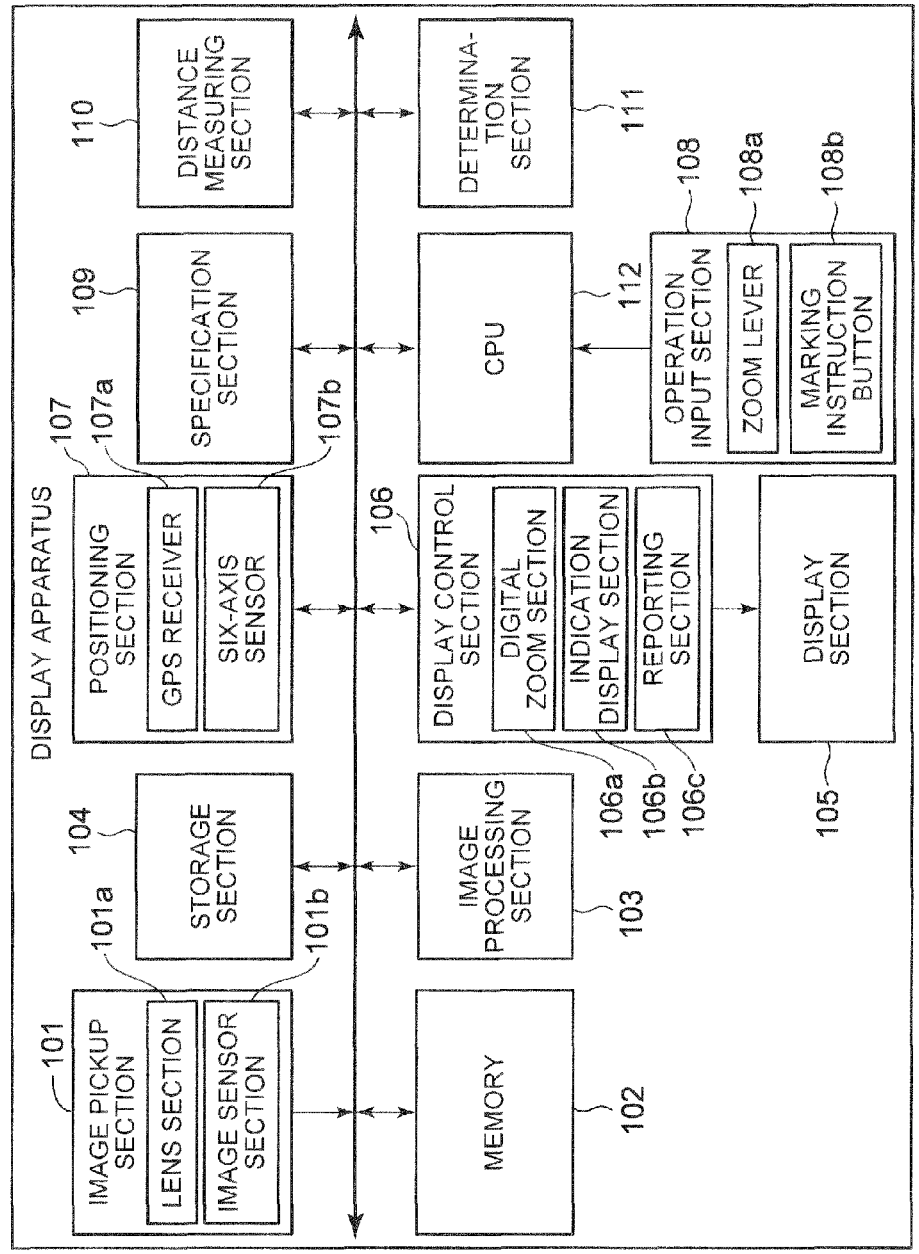
FIG. 1 is a block diagram illustrating a main configuration of a display apparatus of an embodiment of the present invention.

In the following, embodiments of the present invention are described with reference to the accompanying drawings.

However, the scope of the present invention is not limited to the examples illustrated in the drawings in any way.

FIG. 1 is a block diagram illustrating a main configuration of a display apparatus 1 of an embodiment of the present invention.

The display apparatus 1 includes an image pickup section 101, a memory 102, an image processing section 103, a storage section 104, a display section 105, a display control section 106, a positioning section 107, an operation input section 108, a specification section 109, a distance measuring section 110, a determination section 111, a central processing unit (CPU) 112, and the like.

Each of the image processing section 103, the display control section 106, the specification section 109, the determination section 111, and the CPU 112 is designed, for example, as a custom LSI.

The image pickup section 101 picks up images. Specifically, the image pickup section 101 includes a lens section 101a, an image sensor section 101b, and the like. The lens section 101a is composed of a plurality of lenses and includes a zoom lens, a focus lens, and the like.

The image sensor section 101b includes, for example, an image sensor such as a charge coupled device (CCD), a complementary metal-oxide semiconductor (CMOS), or the like, and converts an optical image having passed through the various lenses of the lens section 101a into two-dimensional image signals.

The image sensor section 101b also includes a timing generator and a driver (not illustrated), and the like. The image sensor section 101b makes the timing generator and the driver drive and control the image sensor to convert an optical image into two-dimensional image signals at every predetermined period and reads out an image frame of every screen from an image pickup area of the image sensor. Further, the image sensor section 101b adjusts and controls conditions for picking up an object such as auto-focusing process (AF), automatic exposure process (AE), automatic white balancing process (AWB), and the like.

The image sensor section 101b appropriately executes a gain adjustment to each RGB color component of analog value signals of the image frame which has been transported from the image sensor, executes sample-and-hold of the analog value signal by using a sample-and-hold circuit (not illustrated), and converts the analog value to a digital value by using an A/D converter (not illustrated). Thereafter the image sensor section 101b executes a color process including a pixel interpolation process and a gamma correction process by using a color process circuit (not illustrated) to generate a brightness signal Y and color difference signals Cb and Cr (YUV data) each having a digital value. The brightness signal Y and the color difference signals Cb and Cr output from the color process circuit are transferred by DMA via a DMA controller (not illustrated) to the memory 102 which is used as a buffer memory. The image sensor section 101b sequentially generates the YUV data and transfers the YUV data to the memory 102.

The image pickup section 101 of the embodiment is designed to pick up an image in deep-focus using a predetermined depth of field by using AF.

The memory 102 is configured, for example, with a dynamic random access memory (DRAM), or the like, and temporarily stores data to be processed by the image sensor section 101b, the image processing section 103, the CPU 112, and the like.

The image processing section 103 sequentially reads out YUV data temporarily stored in the memory 102 as image data for displaying the picked up image on the display section 105 as a live view process. Specifically, the image processing section 103 includes a video random access memory (VRAM), a VRAM controller, a digital video encoder, an interface which enables data output to an external display device (all are not illustrated), and the like. The digital video encoder periodically reads out the brightness signal Y and the color difference signals Cb and Cr which have been read out from the memory 102 and are being stored in the VRAM under control of the CPU 112 from the VRAM through the VRAM controller. Then the digital video encoder generates video signals based on the data of the brightness signal Y and the color difference signals Cb and Cr, and outputs the video signals to the display control section 106.

The image processing section 103 executes various image processes for image data stored in the memory 102. Specifically, the image processing section 103 includes a joint photographic experts group (JPEG) compression section (not illustrated), and the like. The JPEG compression section reads out the YUV data which has been output from the image sensor section 101b and is temporarily stored in the memory 102, encodes the YUV data to generate JPEG image data, and outputs the JPEG image data to the storage section 104.

The storage section 104 is configured, for example, with a non-volatile memory (a flash memory), or the like. The storage section 104 stores various programs and data which are read out by the CPU 112, and the image data encoded by the JPEG compression section of the image processing section 103 (not illustrated) for storing the picked up image. The storage section 104 can be a storage device installed in the display apparatus 1, an external storage medium such as a memory card which is dockable through a predetermined interface like a memory card slot, other external storage device, or the like, or a combination thereof.

The display section 105 is, for example, a liquid crystal display. The display section 105 displays a live view image output by the image processing section 103, and indications according to processes executed by the display control section 106, the CPU 112, and the like.

Figure 6:
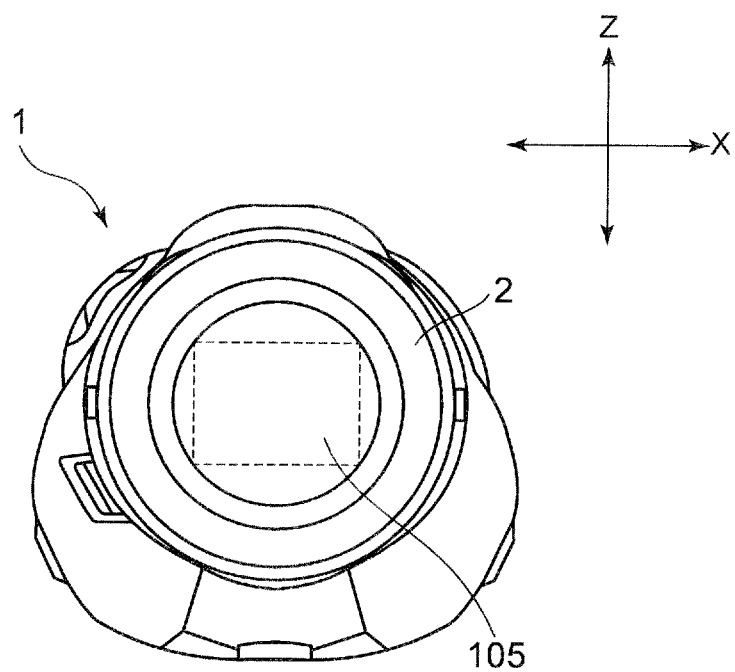
FIG. 6 is a view of the display apparatus when viewed from the side of a viewfinder of the display apparatus.
Figure 7:
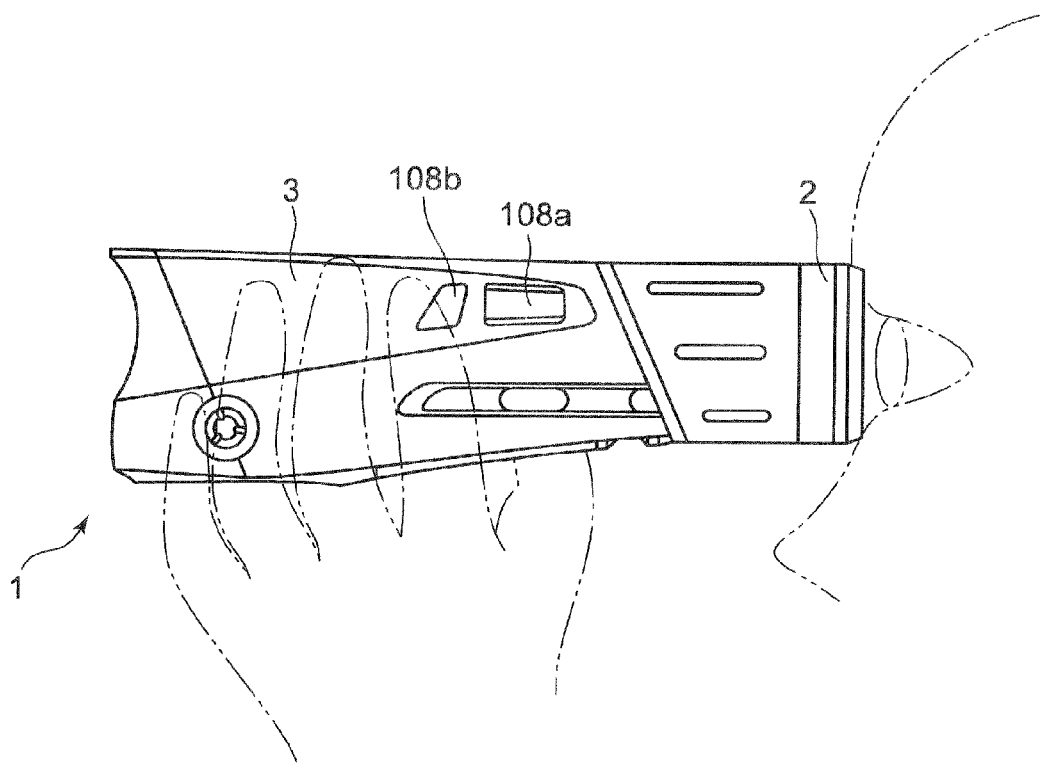
FIG. 7 is a view illustrating a case when a user is looking into the viewfinder of the display apparatus.
Figure 7:
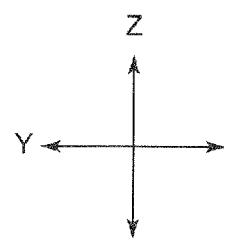

The display section 105 is equipped within a viewfinder 2 of the display apparatus 1 (see FIG. 6). As illustrated in FIG. 7, a user of the display apparatus 1 can visually recognize contents being displayed on the display section 105 equipped within the viewfinder 2 by contacting the viewfinder 2 around a user's eye. That is, the display section 105 and the viewfinder 2 function as an ocular electronic viewfinder.

Figure 8:
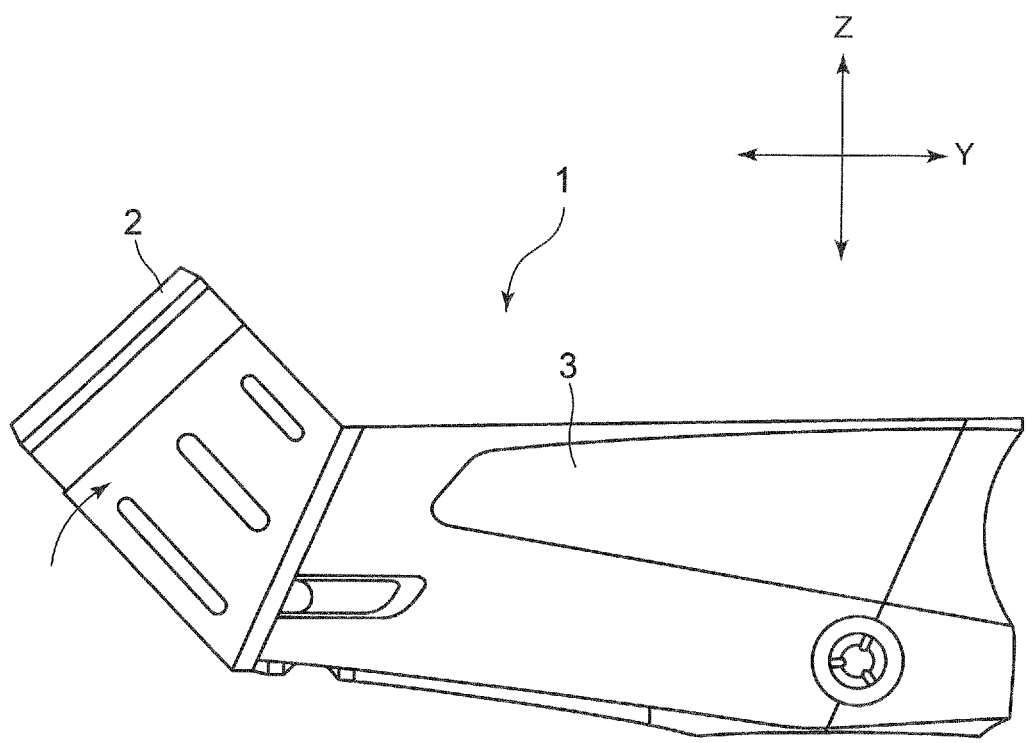
FIG. 8 is a diagram illustrating the display apparatus in a state that an angle between the display apparatus and the viewfinder has been changed from the state illustrated in FIG. 5.

As illustrated in FIG. 8, the viewfinder 2 is designed such that an angle between the viewfinder 2 and a body 3 with which the image pickup section 101 is equipped is adjustable. A change in the angle between the viewfinder 2 and the body 3 can be achieved through, for example, rotating the viewfinder 2 toward or backward the body 3 of the display apparatus 1.

The display control section 106 executes various processes for controlling contents to be displayed in a display area of the display section 105.

The display control section 106, for example, makes the display section 105 execute a live view display according to video signals output from the image processing section 103.

The display control section 106 includes a digital zoom section 106a, an indication display section 106b, a reporting section 106c, and the like.

The digital zoom section 106a executes a magnification process for magnifying a part of the image data used for displaying the magnified part of the image data on the display section 105.

Specifically, when defining a ratio of the number of pixels of image data which is generated so as to correspond to pixels of the image sensor of the image sensor section 101b, to the number of pixels of the display area of the display section 105, is the magnification ratio of one-to-one (i.e., ×1, or not magnified), the digital zoom section 106a executes the magnification process to make the ratio of the number of pixels of the image data to the number of pixels of the display area of the display section 105 one-to-many. That is, the digital zoom section 106a uses a plurality of pixels of the display section 105 for displaying one pixel of the image data to magnify the image to be displayed on the display section 105.

When the magnification process is executed by the digital zoom section 106a, not whole image data of the picked up image is displayed in the display area of the display section 105 since the image data of the picked up image to be displayed on the display section 105 is relatively magnified. Thus an image displayed after execution of the magnification process corresponds to a part of the image data to be displayed.

In the embodiment, the image data corresponding to the central area of the image to be displayed is relatively magnified and displayed. However, this is an example and not limitative. A part of the image data to be magnified by the magnification process and displayed can be any part of the image data.

The magnification ratio of the magnification process by the digital zoom section 106a, that is, the ratio of the number of pixels of the image data to the number of pixels of the display area of the display section 105, is determined according to, for example, a user's operation input through a zoom lever 108a of the operation input section 108.

The indication display section 106b executes a process for displaying an indication T (for example, an indication T illustrated in FIG. 9) at a predetermined position of the display area of the display section 105.

Figure 9:
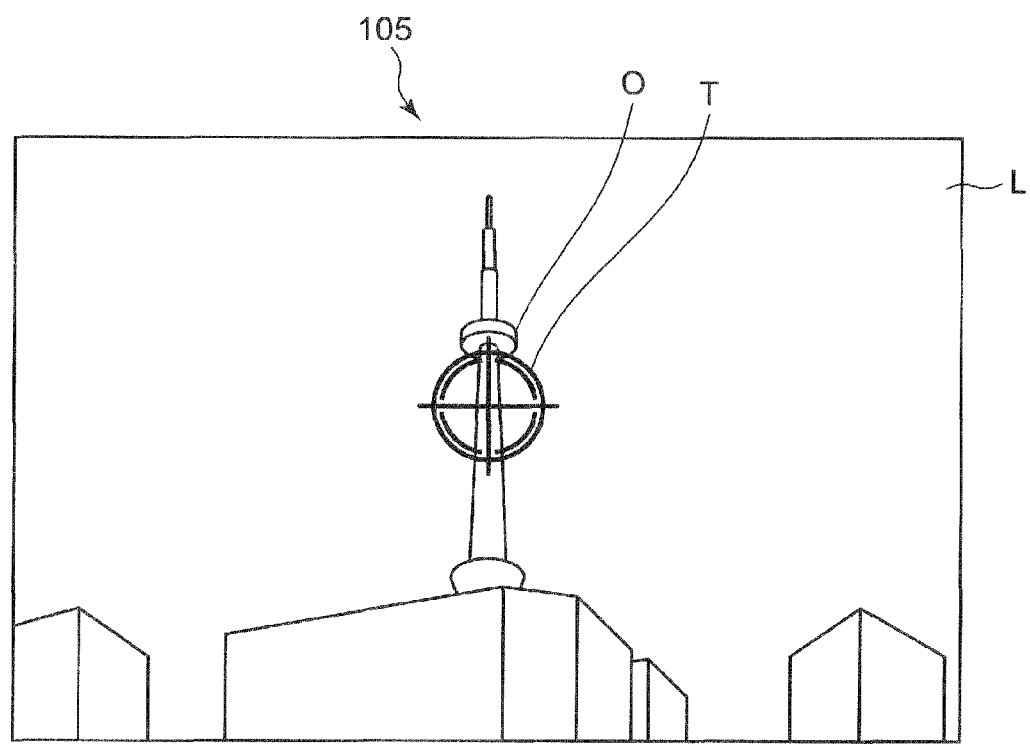
FIG. 9 is a diagram illustrating a display example of an indication displayed so as to be superimposed on a live view image.

For example, as illustrated in FIG. 9, the indication display section 106b makes the display section 105 display the indication T so as to be superimposed on the image being displayed on the display section 105 (for example, a live view image L) at a predetermined position of the display area of the display section 105 (for example, the center of the display area). For example, a relationship between the superimposed indication T and the live view image L is such that the indication T is the foreground and the live view image L is the background.

FIG. 9 illustrates an example that a predetermined position for displaying the indication T is the center of the display area. However, a predetermined position for displaying the indication T is not limited to the example and can be set at any position of the display area of the display section 105.

In the embodiment, the display section 105 displays the indication T when a user has set a marking instruction mode through the mode button of the operation input section 108.

Figure 10:
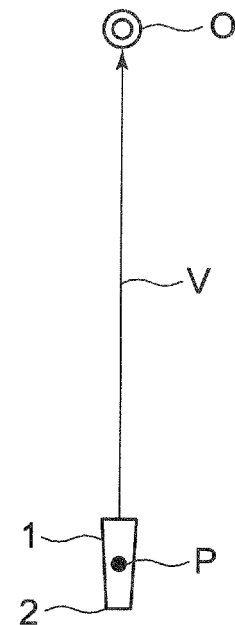
FIG. 10 is a schematic diagram illustrating a method of specifying a position of an object relative to the position of the display apparatus.
Figure 11:
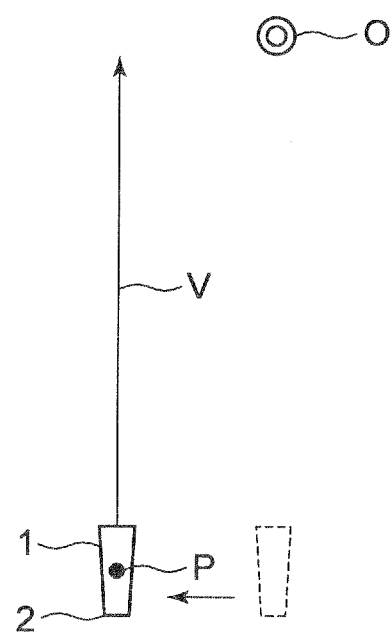
FIG. 11 is a schematic diagram illustrating a case when the object is not being displayed in a display area of the display apparatus.
Figure 12:
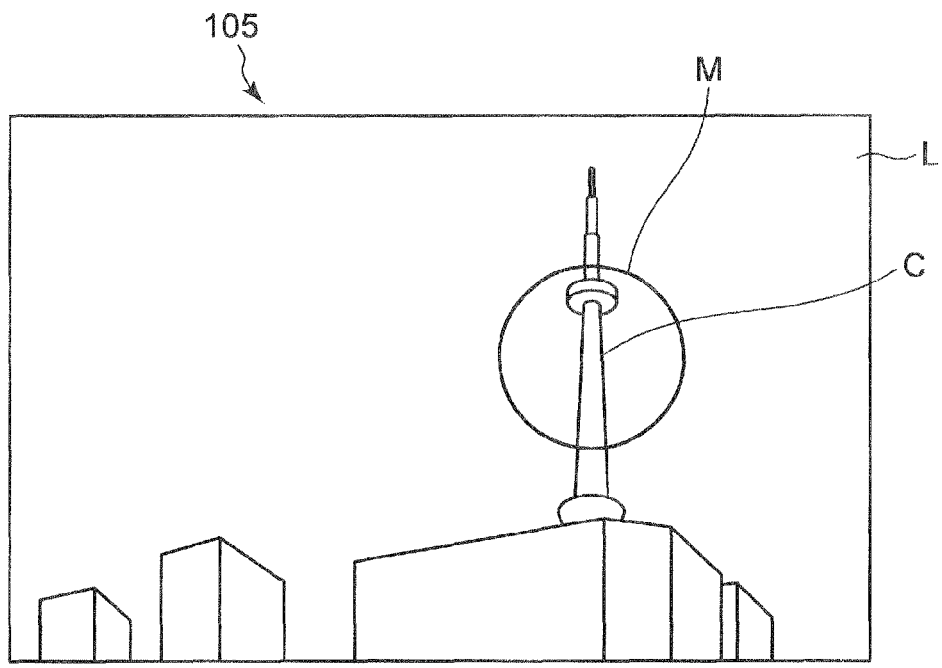
FIG. 12 is a diagram illustrating a display example of a marker indication.

The reporting section 106c executes a reporting process for making a report regarding a position of an object O specified by the specification section 109 (see FIGS. 10 to 12). Details of the reporting section 106c will be described later.

The positioning section 107 obtains information regarding a position of the main body of the display apparatus 1 (hereinafter referred to as "a body position P", see FIGS. 10 and 11) and information regarding a direction of image pickup by the image pickup section 101 (hereinafter referred to as "a image pickup direction V", see FIGS. 10 and 11), and outputs information regarding the body position P and the image pickup direction V to the specification section 109 and the determination section 111.

Specifically, the positioning section 107 includes a global positioning system (GPS) receiver 107a and a six-axis sensor 107b.

The GPS receiver 107a receives signals from a GPS satellite. The positioning section 107 measures the body position P based on the signals from the GPS satellite received by the GPS receiver 107a, and outputs position information regarding the body position P. In the embodiment, the position information regarding the body position P is configured with numerical values of both latitude and longitude.

The six-axis sensor 107b obtains information regarding the image pickup direction V.

Figure 5:
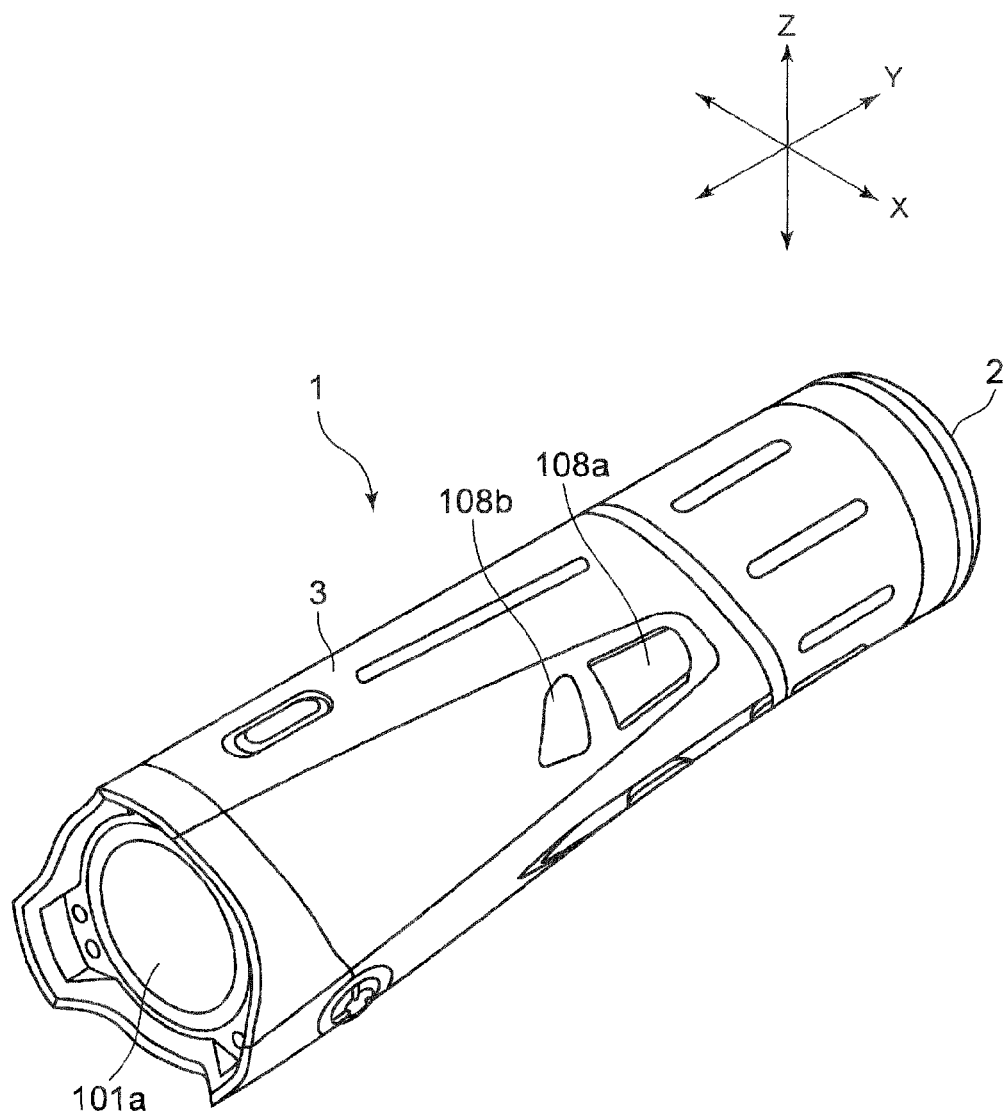
FIG. 5 is a perspective view of the display apparatus.

The six-axis sensor 107b detects and outputs, for example, angles of the body 3 of the display apparatus 1 to X direction, Y direction and Z direction illustrated in FIGS. 5 to 7. The X and the Y directions go along a horizontal plane, and the Z direction crosses the horizontal plane at a right angle. The X direction and the Y direction are at right angles to each other.

The positioning section 107 specifies an angle to which an opening end of the lens section 101a is directed, that is, the image pickup direction V, based on the angles of the body 3 of the display apparatus 1 to the X, the Y and the Z directions output by the six-axis sensor 107b.

The operation input section 108 accepts operations to be input to the display apparatus 1. Specifically, the operation input section 108 includes a power button for switching power on and off of the display apparatus 1 (not illustrated), a shutter button for instructing image pickup (not illustrated), a mode button for changing modes (not illustrated), and a zoom lever 108a for instructing adjustment of a zoom amount, a marking instruction button 108b for inputting an instruction signal for marking the object O included in the image being displayed on the display section 105, and the like, and outputs predetermined operation signals corresponding to operations input through the above-described buttons. The various signals corresponding to the input operations through the operation input section 108 are output to each section by the CPU 112.

For example, as illustrated in FIGS. 5 and 7, the zoom lever 108a and the marking instruction button 108b are placed at predetermined positions of the sidewall of the body 3 which is extended between the end portion where the viewfinder 2 of the display apparatus 1 is set and the opening end of the lens section 101a. The zoom lever 108a and the marking instruction button 108b are placed at the above-described predetermined positions, thus a user can easily input operations through the zoom lever 108a and the marking instruction button 108b while holding the display apparatus 1 and looking into the viewfinder 2.

The specification section 109 specifies the object O based on the image being displayed on the display section 105 and instruction signals generated and output in consequence of operations input through the marking instruction button 108b.

For example, when an operation is input through the marking instruction section 108b by a user during the picked up image is displayed as illustrated in FIG. 9, the instruction signal corresponding to the operation input through the marking instruction button 108b is generated and output to the specification section 109. The specification section 109 specifies an object which is included in the image being displayed on the display section 105 when the specification section 109 receives the instruction signal, as the object O. In the embodiment, the specification section 109 specifies an object included in the image on the display section 105 and being superimposed by the indication T which is displayed at a predetermined position of the display area, as the object O. That is, the marking instruction 108b generates the instruction signal regarding the object O which is included in the live view image L being displayed on the display section 105 and is displayed at a predetermined position of the display area of the display section 105, and outputs the instruction signal to the specification section 109.

In addition, the specification section 109 specifies a position of the marked object O based on the body position P and the image pickup direction V of the display apparatus 1 which are obtained by the positioning section 107.

Specifically, first, the specification section 109 obtains information regarding the body position P of the display apparatus 1 (latitude and longitude) specified based on the GPS signals received by the GPS receiver 107a of the positioning section 107.

Next, the specification section 109 obtains information regarding the image pickup direction V specified based on the angles output by the six-axis sensor 107b of the positioning section 107.

Then the specification section 109 specifies the position of the object O (for example, the object O illustrated in FIG. 10) based on the body position P of the display apparatus 1 determined from latitude and longitude (for example, the body position P illustrated in FIG. 10) with defining that the object O exists in the image pickup direction V (for example, the image pickup direction V illustrated in FIG. 10).

The specification section 109 can specify the position of the object O relative to the position of the display apparatus 1 further based on a distance, measured by a distance measuring section 110, between the position of the main body of the display apparatus 1 and the position of the object O having been marked according to the instruction signal from the marking instruction button 108b. In this case, the specification section 109 specifies the position of the object O based on the body position P of the display apparatus 1 determined from latitude and longitude with defining that the object O exists in the image pickup direction V at the distance measured by the distance measuring section 110 from the main body of the display apparatus 1.

The distance measuring section 110 measures the distance between the position of the main body of the display apparatus 1 and the position of the object O having been marked according to the instruction signal input from the marking instruction button 108b.

For example, the distance measuring section 110 specifies an image pickup distance based on a distance of the depth of field determined according to the configuration of the lens section 101a and the magnification ratio of the magnification process by the digital zoom section 106a. In this case, the distance measuring section 110 sets the distance of the depth of field (for example, the distance at which the marked object O is in focus when picked up in deep focus) as a reference distance, corrects the reference distance according to the magnification ratio of the magnification process, and measures the range of the distance between the main body of the display apparatus 1 and the marked object O.

However, the method of measuring the distance by the distance measuring section 110 is not limited to the above. For example, the distance measuring section 110 can include a specific sensor using such as a light emitting diode emitting infrared light to measure the distance to the object O.

The determination section 111 determines whether the object O is being displayed on the display section 105 or not, and outputs information regarding a result of the determination to the display control section 106.

For example, as illustrated in FIG. 11, there would be a case where the body position P of the display apparatus 1 changed and the object O does not exist in the angular field of the image pickup section 101.

The determination section 111 determines whether the object O is being displayed on the display section 105 or not based on the position of the object O specified based on the body position P of the display apparatus 1. Specifically, the determination section 111 sets the body position P (latitude and longitude) and the image pickup direction V of the display apparatus 1 which are obtained when the object O is marked and the position thereof is specified, as a reference body position P and a reference image pickup direction V, respectively. Then the determination section 111 obtains an amount of change in the body position P and the image pickup direction V based on comparison between the reference body position P and the reference image pickup direction V, and the current body position P and the current image pickup direction V, respectively, by referring to information output from the positioning section 107. Thereafter the determination section 111 determines whether the object O is being in the angular field of the image pickup section 101 or not based on the amount of change in the body position P and the image pickup direction V. When the determination section 111 determines that the object O is not being in the angular field of the image pickup section 101, the object O is determined as not being displayed on the display section 105.

When a process for limiting an area of the image to be displayed on the display section 105 compared to the angular field of the image pickup section 101, for example, the magnification process by the digital zoom section 106a, is executed, an area of the image being displayed on the display section 105 is smaller than an area of the image determined based on the angular field of the image pickup section 101. Thus an angular field determined based on the display area of the display section 105 (hereinafter referred to as "an apparent angular field") is narrower than the angular field of the image pickup section 101. Accordingly, when the magnification process is executed by the digital zoom section 106a, the determination section 111 further obtains the magnification ratio of the magnification process to determine whether the object O is being in the apparent angular field or not. When the object O is determined as not being in the apparent angular field, the object O is determined as not being displayed on the display section 105. On the other hand, when the object O is determined as being in the apparent angular field, the object O is determined as being displayed on the display section 105.

When the magnification process by the digital zoom section 106a is not executed and the object O is determined as being in the angular field of the image pickup section 101, the object O is determined as being displayed on the display section 105.

Information which is regarding a result of the determination and output by the determination section 111 is used for the reporting process executed by the reporting section 106c. Specifically, the reporting section 106c varies a content of the report according to the result of the determination of the determination section 111.

For example, when the object O is determined as being displayed on the display section 105 by the determination section 111, the reporting section 106c makes the display section 105 display a marker indication which indicates the object O displayed on the display section 105.

Specifically, as illustrated in FIG. 12, when the object O is included in the live view image L being displayed on the display section 105, the reporting section 106c makes the display section 105 superimpose a display content including a marker M and indicating the object O on the image being displayed on the display section 105.

On the other hand, when the object O is determined as not being displayed on the display section 105 by the determination section 111, the reporting section 106c makes the display section 105 display a guide indication which indicates where the object O being out of the display area of the display section 105 exists.

Figure 13:
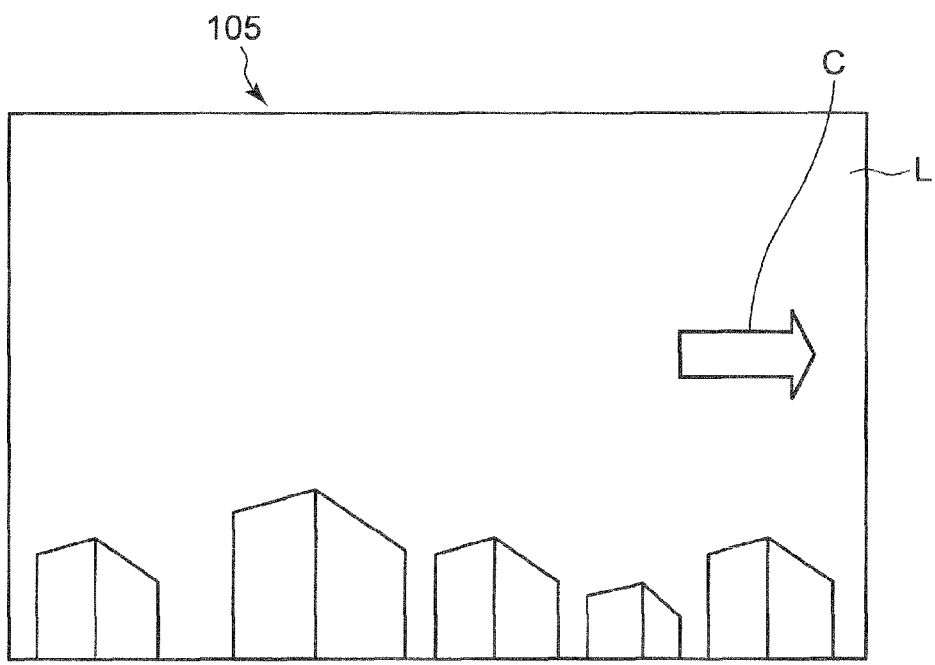
FIG. 13 is a diagram illustrating a display example of a guide indication including a directional marker on a live view image.

Specifically, as illustrated in FIG. 13, when the object O is not included in the live view image L being displayed on the display section 105, the reporting section 106c makes the display section 105 superimpose a display content including a directional marker C which indicates a direction in which the object O exists based on the body position P of the display apparatus 1, which object being out of the display area of the display section 105, on the image being displayed on the display section 105.

The reporting section 106c can report information regarding the position of the object O specified by the specification section 109 further based on the distance measured by the distance measuring section 110.

For example, the reporting section 106c makes the display section 105 display the directional marker illustrated in FIG. 13 in three-dimensional model on the display section 105. In this case, when the object O exists farther than a predetermined distance from the body position P of the display apparatus 1, the reporting section 106c reports the position of the object O by using the directional marker in three-dimensional model which indicates far side of the image with indicating a direction in which the object O exists, so that the reporting section 106c can indicate that the object O exists far from the display apparatus 1.

On the other hand, when the object O exists nearer than a predetermined distance from the body position P of the display apparatus 1, the reporting section 106c reports the position of the object O by using the directional marker in three-dimensional model which indicates near side of the image with indicating a direction in which the object O exists, so that the reporting section 106c can indicate that the object O exists near the display apparatus 1.

Here, "the directional marker indicates far side of the image" means displaying the directional marker to be seemed such that the directional marker indicates a remote position from the body position of the display apparatus 1. On the other hand, "the directional marker indicates near side of the image" means displaying the directional marker to be seemed such that the directional marker indicates a close position from the body position of the display apparatus 1. What "remote" or "close" means is a relative concept and a change in an appearance of the directional marker is enough if a change in direction in which the directional marker indicates is clearly recognized by comparing appearances of the directional markers in three-dimensional model.

An appearance of the directional marker can also be changed based on a correspondence relationship between the size of the display area of the display section 105 and a displayed size of the object O resulted from the magnification process executed by the digital zoom section 106a or the like. For example, when the displayed size of the object O is too small compared to the size of the display area of the display section 105, the directional marker can indicate far side of the image. On the other hand, when the displayed size of the object O is too large compared to the size of the display area of the display section 105, the directional marker can indicate near side of the image.

The CPU 112 controls each section of the display apparatus 1. Specifically, the CPU 112 executes various controls and operations according to various processing programs for the display apparatus 1 (not illustrated).

Figure 2:
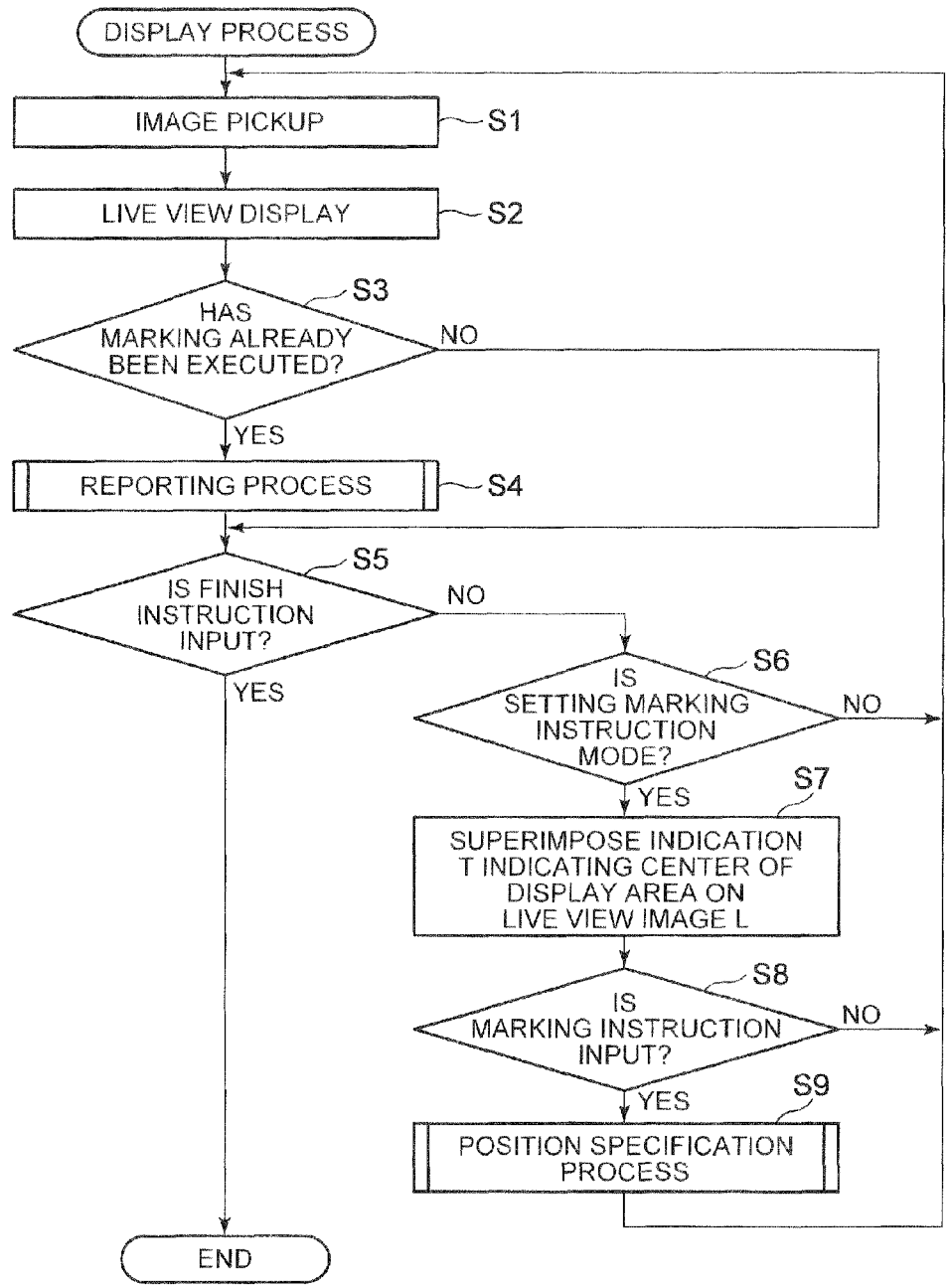
FIG. 2 is a flowchart illustrating an exemplary flow of a display process.

Among processes executed by the display apparatus 1, processes for display executed by the display section 105 (hereinafter referred to as "a display process") will be described below with referring to the flowchart of FIG. 2.

First, the image pickup section 101 picks up an image (STEP S1). Specifically, the zoom lens and the focus lens of the lens section 101a brings the lens section 101a into focus to be in deep focus using a predetermined depth of field. Then the lens section 101a transmits an optical image to the image sensor section 101b. Thereafter the image sensor section 101b sequentially generates YUV data corresponding to the optical image, and the YUV data is stored in the memory 102.

Then the display apparatus 1 executes a live view display by the display section 105 (STEP S2). Specifically, the image processing section 103 sequentially reads out the YUV data as image data to be displayed from the memory 102, and outputs the YUV data to the display control section 106. The display control section 106 makes the display section 105 sequentially display the image data to be displayed which is output from the display processing section 103.

Next, the display control section 106 determines whether a marking instruction to mark the object O has already been executed or not (STEP S3). When the marking instruction is determined as having been already executed (STEP S3: YES), the display control section 106 executes the reporting process (STEP S4).

Figure 3:
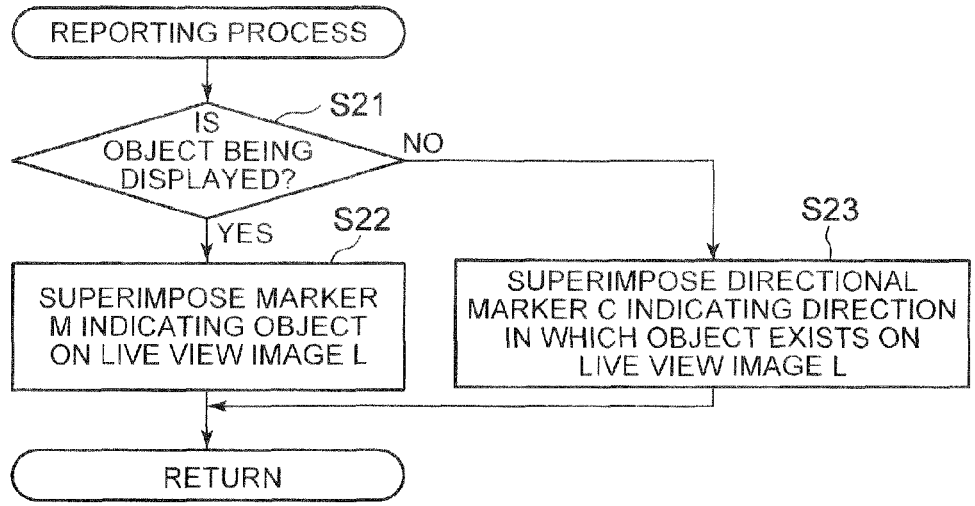
FIG. 3 is a flowchart illustrating an exemplary flow of a reporting process.

The reporting process will be described with referring to the flowchart of FIG. 3.

First, the determination section 111 sets the body position P (latitude and longitude) and the image pickup direction V of the display apparatus 1 which are obtained when the object O is marked and a position thereof is specified, as a reference body position P and a reference image pickup direction V, respectively. Then the determination section 111 obtains an amount of change in the body position P and the image pickup direction V by comparison between the reference body position P and the reference image pickup direction V, and the current body position P and the current image pickup direction V respectively, with referring to information output from the positioning section 107. Then the determination section 111 determines whether the object O is being displayed on the display section 105 or not based on the amount of change and the magnification ratio of the magnification process by the digital zoom section 106a (STEP S21).

As illustrated in FIG. 12, when the determination section 111 determines the object O is being displayed on the display section 105 (STEP S21: YES), the reporting section 106c of the display control section 106 makes the display section 105 superimpose the marker M indicating the object O on the live view image L (STEP S22). Then the reporting process is finished.

On the other hand, as illustrated in FIG. 13, when the determination section 111 determines the object O is not being displayed on the display section 105 in STEP S21 (STEP S21: NO), the reporting section 106c makes the display section 105 superimpose the directional marker C indicating a direction in which the object O exists, on the live view image L (STEP S23). Then the reporting process is finished.

After the reporting process has finished, when a finish instruction, that is, an instruction through the power button to switch off the display apparatus 1 is input by a user (STEP S5: YES), the display process is finished. The display process is also finished when the marking instruction to mark the object O is determined as not having been executed yet (STEP S3:

NO) and the finish instruction to switch off the display apparatus 1 is input through the power button (STEP S5: YES).

On the other hand, when the instruction to switch off the display apparatus 1 is not input through the power button by a user (STEP S5: NO), the display control section 106 determines whether a mode set by a user through the mode button of the operation input section 108 is the marking instruction mode or not (STEP S6). When the mode set by a user is determined as the marking instruction mode (STEP S6: YES), as illustrated in FIG. 9, the indication display section 106*b* makes the display section 105 display the indication T at a predetermined position of the display area of the display section 105 (for example, the center of the display area) (STEP S7).

Next, the display control section 106 determines whether the marking instruction to mark the object O is already input by a user through the marking instruction button 108*b* of the operation input section 108 or not (STEP S8). When the marking instruction to mark the object O is determined as already input (STEP S8: YES), the display apparatus 1 executes a position specification process (STEP S9).

Figure 4:
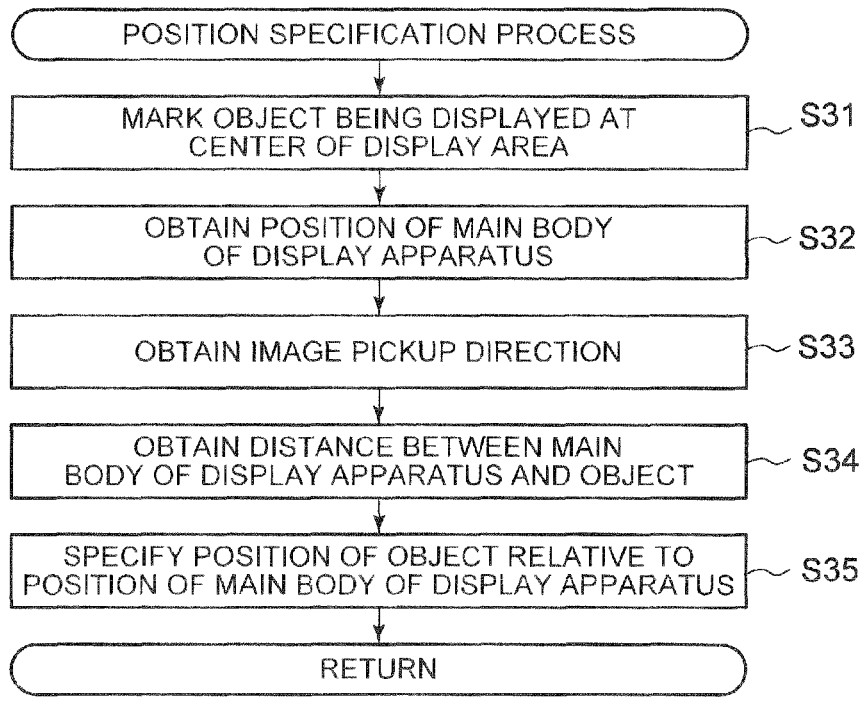
FIG. 4 is a flowchart illustrating an exemplary flow of a position specification process.

The position specification process will be described with referring to the flowchart of FIG. 4.

First, the specification section 109 marks an object which is included in the live view image being displayed on the display section 105, displayed at a predetermined position of the display area of the display section 105 (for example, the center of the display area), and superimposed by the indication T, as the object O (STEP S31).

Next, the specification section 109 obtains information regarding the body position P of the display apparatus 1 (latitude and longitude) specified based on GPS signals received by the GPS receiver 107*a* of the positioning section 107 (STEP S32).

The specification section 109 also obtains information regarding the image pickup direction V of the display apparatus 1 for picking up the object O specified based on the angles detected by the six-axis sensor 107*b* of the positioning section 107 (STEP S33).

The specification section 109 further obtains the distance between the main body of the display apparatus 1 and the marked object O measured by the distance measuring section 110 (STEP S34).

Thereafter the specification section 109 specifies the position of the object O (for example, the object O illustrated in FIG. 10) based on the body position P of the display apparatus 1 determined from latitude and longitude (for example, the body position P illustrated in FIG. 10) with defining that the object O exists in the image pickup direction V (for example, the image pickup direction V illustrated in FIG. 10) at the distance measured by the measuring section 110 from the main body of the display apparatus 1 (STEP S35). Then the position specification process is finished.

After the position specification process is finished, the process of STEP S1 is executed. The process of STEP S1 is also executed after a mode set by a user is determined, in STEP S6, as not the marking instruction mode (STEP S6: NO), or after the marking instruction is determined, in STEP S8, as not instructed (STEP S8: NO).

In view of the foregoing, according to the display apparatus 1 of the embodiment, a user of the display apparatus 1 inputs the instruction to mark the object O which is included in the image being displayed on the display section 105 equipped within the viewfinder 2, so that a user of the display apparatus 1 can easily specify the object O without taking a user' eye off the viewfinder 2 to mark the object O while looking into the viewfinder 2 of the display apparatus 1.

Further, when marking is instructed, the specification section 109 specifies the position of the object O relative to the body position P of the display apparatus 1 based on the body position P and the image pickup direction V of the display apparatus 1, and the reporting section 106*c* executes the reporting process for reporting the position of the object O. Thus a user of the display apparatus 1 can be provided information regarding the position of the object O while looking into the viewfinder 2 of the display apparatus 1.

The display section 105 superimposes the indication T at a predetermined position of the display area (for example, at the center of the display area) on the image being displayed in the display area of the display section 105, so that a user of the display apparatus 1 can be clearly shown which the object O to be marked is among displayed contents in the display area of the display section 105 according to the position of the object O on the display area of the display section 105. Thus a user of the display apparatus 1 can more easily specify the object O.

The reporting section 106*c* varies the content of the report according to a result of the determination by the determination section 111. Thus a user of the display apparatus 1 can be informed whether the object O is being displayed on the display section 105 or not, and informed whether the object O is being included in displayed contents on the display section 105 while looking into the viewfinder 2.

For example, there would be a case where, after a user of the display apparatus 1 inputs the instruction to mark the object O, another user (a second user) is handed the display apparatus 1 and looks into the viewfinder 2 to find the marked object O. Thus the body position P of the display apparatus 1 can be changed and the object O can be out of the angular field of the image pickup section 101 or the apparent angular field which is determined from the magnification process by the digital zoom section 106*a*. In such a case, the reporting section 106*c* varies the content of the report according to whether the marked object O is being displayed on the display section 105 or not. Thus the second user can be informed whether the marked object O is being displayed on the display section 105 or not.

When the determination section 111 determines the object O is being displayed on the display section 105, the reporting section 106*c* makes the display section 105 display the marker indication M which indicates the object on the display section 105. Thus a user of the display apparatus 1 can be informed of the position of the object O on the display section 105, and informed of existence of the object O in displayed contents on the display section 105 and the position of the object O on the display section 105 while looking into the viewfinder 2.

On the other hand, when the determination section 111 determines the object O is not being displayed on the display section 105, the reporting section 106*c* makes the display section 105 display the guide indication for indicating the direction in which the object O being out of the display area of the display section 105 exists. Thus a user of the display apparatus 1 can be informed of the position of the object O, and informed that the object O is not included in displayed contents on the display section 105 and can be guided where the object O exists to make the object O included in displayed contents on the display section 105, while looking into the viewfinder 2.

The reporting section 106*c* makes the display section 105 display the indication including the directional marker C as the guide indication which indicates the direction in which the object O exists. Thus a user of the display apparatus 1 can be informed of the direction in which the object O exists and can refer the guide indication to make the object O displayed on the display section 105 by moving the display apparatus and/or turning an image pickup direction while looking into the viewfinder 2.

The reporting section 106c executes the reporting process based on the distance between the display apparatus 1 and the object O marked according to the input instruction signal, thus a user of the display apparatus 1 can be provided information based on the distance between the main body of the display apparatus 1 and the marked object O while looking into the viewfinder 2.

Modification

A display apparatus 1A of a modification of the present invention will be described below with referring to FIGS. 14 to 16. The configurations of the display apparatus 1A same as shown in FIG. 1 or described in the above description are given the same number and descriptions thereof are omitted.

Figure 14:
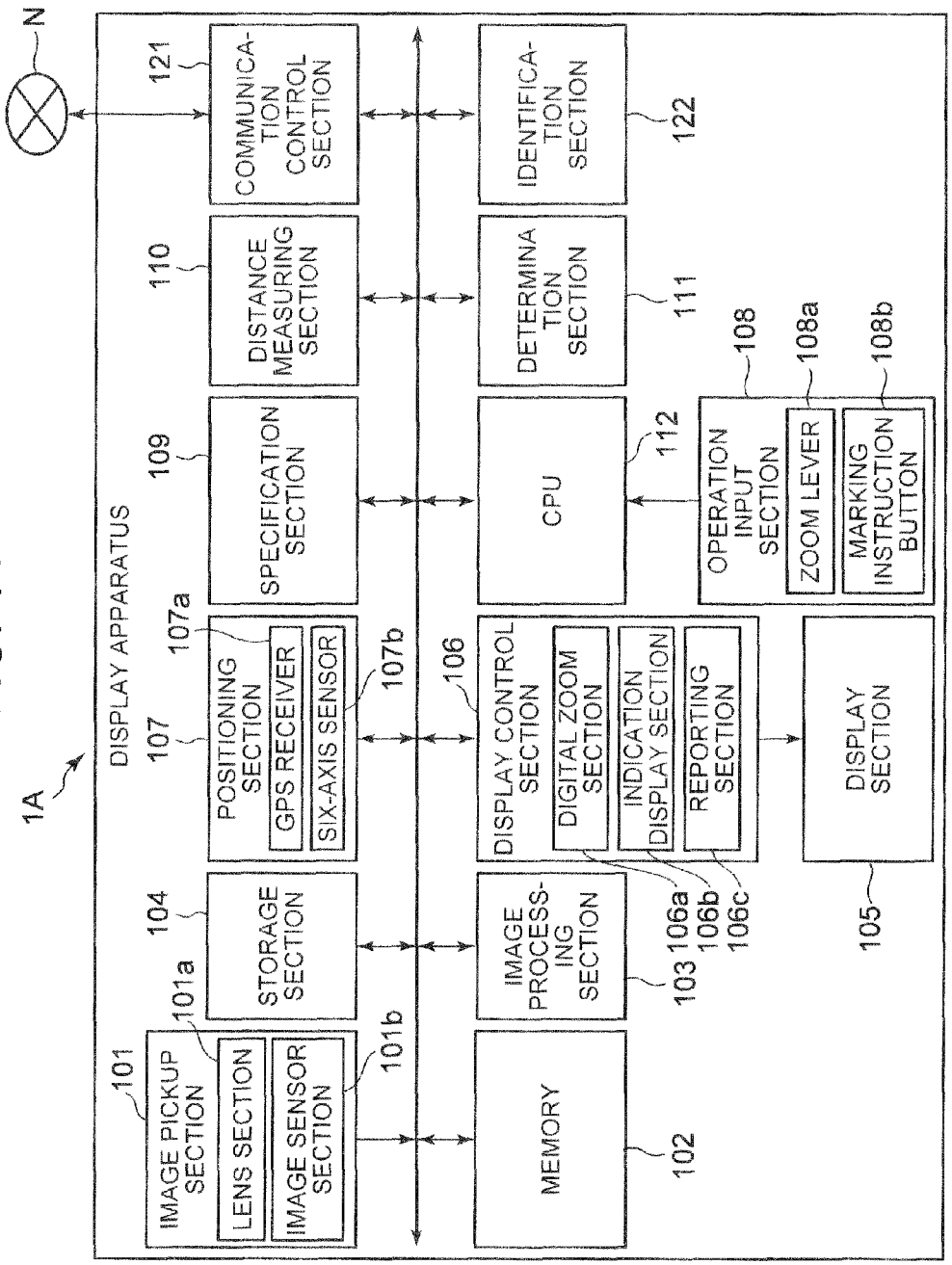
FIG. 14 is a block diagram illustrating a main configuration of a display apparatus of a modification.

As illustrated in FIG. 14, the display apparatus 1A of the modification includes, in addition to the display apparatus 1, a communication control section 121 and an identification section 122. The identification section 122 is designed as, for example, a custom LSI.

The communication control section 121 includes, for example, a communication antenna, a communication circuit (not illustrated), and the like, and controls communication between the display apparatus 1A and an external information-processing device connected to each other through a communication network N which complies with a predetermined telecommunication standard (for example, a communication standard in conformity to 3G: international mobile telecommunication 2000 (3G:IMT-2000) or a wireless LAN, or the like).

The communication network N is, for example, constructed by utilizing an exclusive line or an existing general public line, and a line style to be applied with the communication network N can be selected from various line styles such as a local area network (LAN), a wide area network (WAN), or the like. The communication network N includes various line networks such as a telephone network, an ISDN line network, an exclusive line, a mobile communication network, a satellite network, a CATV line network, and the like, and an internet service provider which connects the above-mentioned lines each other.

The identification section 122 identifies the object O based on the position of the object O specified by the specification section 109.

Specifically, the identification section 122 identifies the object O based on, for example, information obtained from an external information-processing device. More specifically, the identification section 122 sends information regarding the position of the object O specified based on the body position P determined from latitude and longitude of the display apparatus 1A and the image pickup direction V as search queries and a request for information regarding the object O to the external information-processing device (for example, a server providing information retrieval service, or the like) through the communication control section 121. The identification section 122 receives information as a response to the request from the external information-processing device, and identifies the object O based on the received information.

Figure 15:
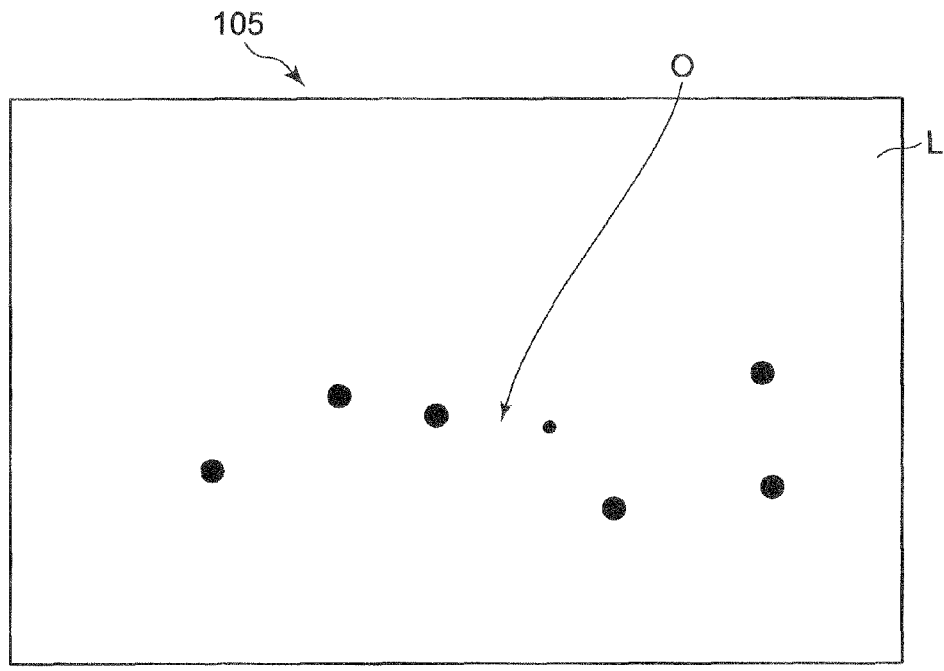
FIG. 15 is a diagram illustrating an example of a live view image including a plurality of stars on the night sky.

For example, FIG. 15 illustrates a case when a user of the display apparatus 1A is looking into the viewfinder 2 of the display apparatus 1A toward the night sky and marks one or a plurality of visible stars on the night sky as the object O. In this case, the identification section 122 sends information regarding the position of the object O (for example, a direction in the night sky) specified based on the body position P and the image pickup direction V of the display apparatus 1A when viewing one or a plurality of stars illustrated in FIG. 15 as search queries and a request for information regarding the object O to the external information-processing device. Then the identification section 122 receives a response to the request from the external information-processing device, and identifies the object O based on the received information. In the case of FIG. 15, obtained information as a result of the identification is such as "the Big Dipper", "Ursa Major", or the like.

The identification section 122 obtains information regarding the identified object O.

Specifically, the identification section 122 sends the information obtained through the identification (for example, "the Big Dipper" or "Ursa Major" as a result of the identification in a display example illustrated in FIG. 15) as search queries and a request for information regarding the identified object O to the external information-processing device (for example, a server providing an information retrieval service, or the like). Then the identification section 122 receives a response to the request as information regarding the identified object O from the external information-processing device.

In the modification, the reporting section 106c of the display control section 106 reports information regarding the identified object O obtained by the identification section 122.

Figure 16:
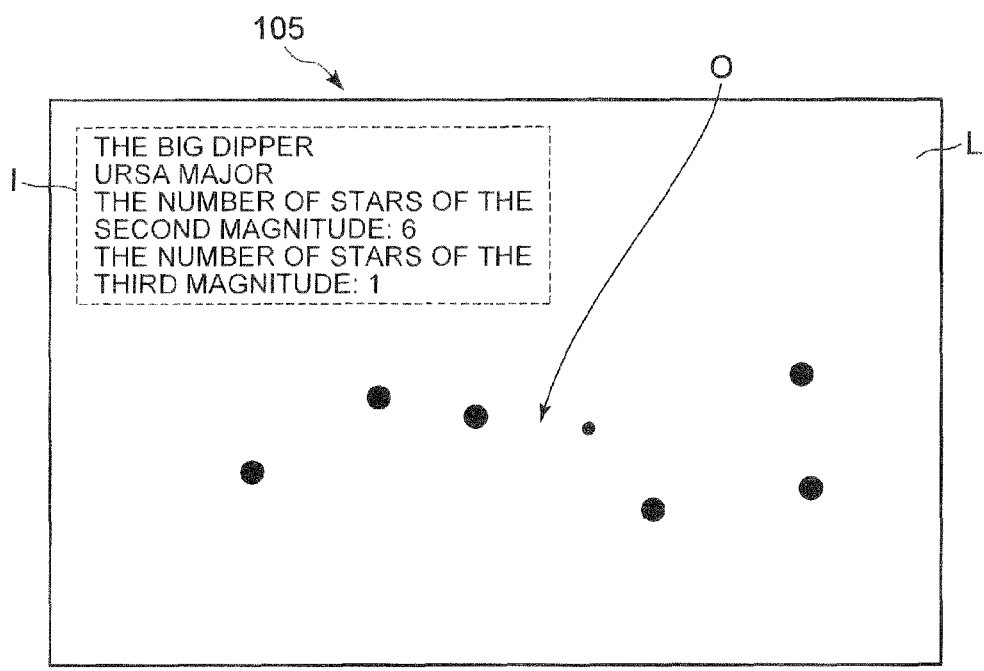
FIG. 16 is a diagram illustrating a display example of information regarding a plurality of stars on the night sky which are specified as the object.

Specifically, for example as a display example illustrated in FIG. 16, the reporting section 106c makes the display section 105 display information I regarding the object O obtained by the identification section 122 in a predetermined area of the display area of the display section 105 which is displaying a plurality of stars on the night sky as a live view display illustrated in FIG. 15. The information I regarding the identified object O illustrated in FIG. 16 includes a name of an asterism ("the Big Dipper") and a name of a constellation including the asterism ("Ursa Major") as results of the identification, and a magnitude of a star included in the asterism, and the like. However, the above-mentioned displayed contents are examples and not limitative. Information regarding the object O to be obtained and reported can variously change according to the object O.

The identification section 122 can use information regarding except for the position of the object O specified by the specification 109 as search queries to identify the object O.

For example, a clocking section for timing the current time can be installed in the display apparatus 1A to use the current time as a search query for searching information regarding the identified object O.

Information regarding the identified object O can be obtained based on information except for the information regarding results of the identification.

According to the modification described above, the identification section 122 identifies the object O based on the position of the object O specified by the specification section 109 and obtains information regarding the identified object O, and the reporting section 106c reports the obtained information regarding the object O. Thus a user of the display apparatus 1A can be provided information regarding the object O while looking into the viewfinder 2.

Further, the display apparatus 1A of the modification includes the communication control section 121, and the identification section 122 obtains information regarding the identified object O through the communication control section 121, so that information regarding the identified object O can be obtained among various kind of information stored in the external information-processing device. Accordingly, a user of the display apparatus 1A can be provided much information while looking into the viewfinder 2.

The above-mentioned embodiments of the present invention disclosed herewith are merely an example and does not limit the present invention in all respects. The present invention includes all changes within the scope of the present invention.

For example, although the above-described reporting section 106c makes the display section 105 display information to be reported, this is a concrete example of reporting and not limitative. For example, a voice output section can be installed to report information by voice.

Further, in the above description, the reported information is superimposed on the live view image (for example, the marker M illustrated in FIG. 12, the directional marker C illustrated in FIG. 13, or the like). However, this is a concrete example of reporting and not limitative. For example, a specific area for displaying information to be reported can be set within the display area of the display section 105. A specific display device for reporting can also be further equipped within the viewfinder 2.

The appearance of the marker M and the directional marker C are examples for displaying information to be reported and not limitative. For example, other shape can be used as a marker indication, and any signs for indicating where the object O exists can be used. Further, a display content for reporting can be obtained partly based on the image picked up by the image pickup section 101 or an image obtained from the external information-processing device (for example, an AR marker).

The above-described identification section 122 transmits and receives information through the communication control section 121 to identify the object O and obtains information thereof. However, this is an example and not limitative. For example, a storage device can be equipped within the display device 1A which stores in advance a result of the identification and information regarding the object O (for example, data of a star map representing positional relationship between the body position P and the image pickup direction V and stars to be picked up, constellations and asterisms included in a star map, and the like) to identify the object O and obtain information regarding the identified object O based on the stored information in the storage device.

The identification section 122 can execute identification not only by information search. For example, identification of the object O can be performed through image matching between an image including the object O picked up by the image pickup section 101 and an image obtained from the storage section.

In the above-described embodiment, the instruction signal is input through input operation to the marking instruction button 108b. However, this is an example and not limitative. For example, marking of the object O can be automatically executed in a way such that an object displayed based on the predetermined condition at the predetermined position of the display device such as the display section 105 is automatically marked as the object 0. An example of predetermined condition is, for example, that when a similarity ratio obtained through the image matching is equal to or above a predetermined standard value, marking is automatically instructed.

Further, the above-described distance measurement between the main body of the display apparatus and the marked object O by the distance measuring section 110 is an example and not limitative.

For example, if the lens section 101a includes a zoom drive section for moving the zoom lens in a direction along an optical axis and an optical zoom system such as a focusing drive section for moving a focus lens in the direction along the optical axis when picking up an object, the distance between the display apparatus 1 and the marked object O can be measured based on a focal length specified through operations of the optical zoom system.

Further, although the above-described identification section 122 identifies the object O and obtains information regarding the identified object 0, identification of the object O and obtaining information regarding the identified object O can be executed by a distinct configuration respectively.

Information regarding the identified object O can also be provided in a way, for example, such as displaying an address information of a web site (for example, uniform resource locator (URL), and the like) or displaying a moving image regarding the identified object O on the display section 105.

In addition, in the above-described embodiments, the configuration of the present invention is achieved by driving the display control section 106, the positioning section 107, the specification section 109, the determination section 111, and the like, under control of the CPU 112. However, this is not limitative. The configuration of the present invention can be achieved through executing predetermined programs by the CPU 112.

That is, a program memory (not illustrated) may be provided to store programs including an instruction routine, a position obtaining routine, a direction obtaining routine, a specification routine, a reporting routine, and the like. The CPU 112 can generate an instruction signal for marking an object included in the image displayed by the display section by the instruction routine. The CPU 112 can obtain the position of the main body of the display apparatus by the position obtaining routine. The CPU 112 can obtain the pickup direction by the image pickup section by the direction obtaining routine. The CPU 112 can specify the position of the specified object relative to the position of the main body of the display apparatus based on the obtained position of the display apparatus and the obtained image pickup direction according to an instruction signal input by the specification routine. The reporting routine can make the CPU 112 execute a reporting process for making a report regarding the position of the specified object.

Similarly, other processes which each section of the display apparatus 1 or 1A execute can be performed through executions of predetermined programs by the CPU 112.

In addition, a storage medium for executing the above-mentioned processes is not limited to a ROM, a hard disk, or the like. For example, a removable media such as a nonvolatile semiconductor memory like a flash memory or a CD-ROM can also be applied. Moreover, as a media for providing data of programs through a predetermined communication line, career waves can be applied.

The entire disclosure of Japanese Patent Application No. 2011-174478 filed on Aug. 10, 2011 including description, claims, drawings, and abstract are incorporated herein by reference in its entirety.

While the present invention has been described with reference to the preferred embodiments, it is intended that the invention be not limited by any of the details of the description therein but includes all the embodiments which fall within the scope of the appended claims.

The invention claimed is:
1. A display apparatus comprising:
an image pickup section to sequentially pick up an image;
a display section to display the image picked up by the image pickup section;
an instruction section to receive an input of an instruction signal for marking an object, the object being included in the image displayed by the display section and being displayed at a predetermined position of the display section;
a position specification section to specify a position of the display apparatus;
a direction specification section to specify a pickup direction of the image pickup section;
a specification section to specify a position of the marked object relative to the position of the display apparatus at a time of the input of the instruction signal, based on the position of the display apparatus specified by the position specification section at the time of the input of the instruction signal, and based on the pickup direction specified by the direction specification section at the time of the input of the instruction signal, in response to the input of the instruction signal from the instruction section;
an amount-of-change measuring section to measure an amount of change in the position of the display apparatus and the pickup direction, from the time of the input of the instruction signal, the change being associated with movement of the display apparatus, by comparing (i) a reference position and a reference image pick up direction of the display apparatus to (ii) a current position and a current image pick up direction of the display apparatus;
a reporting section to report the position of the marked object in accordance with a specification result of the specification section; and
a renewing section to renew the position of the marked object depending on a measurement result of the amount-of-change measuring section, and to renew a report reported by the reporting section depending on the renewed position.

2. The display apparatus of claim 1, wherein the display section displays an indication indicating the predetermined position such that the indication is superimposed on the image on the display section.

3. The display apparatus of claim 1, further comprising a determination section to determine whether or not the marked object is being displayed on the display section, wherein the reporting section varies a content of its report according to a determination result of the determination section.

4. The display apparatus of claim 3, wherein:
when the determination section determines the marked object is being displayed on the display section, the reporting section makes the display section display a marker indication indicating the position of the marked object, and
when the determination section determines the marked object is not being displayed on the display section, the reporting section makes the display section display a guide indication indicating that the position of the marked object exists out of the display section.

5. The display apparatus of claim 4, wherein the guide indication includes a directional marker indicating a direction in which the marked object exists relative to the position of the display apparatus.

6. The display apparatus of claim 1, further comprising a distance measuring section to measure a distance between the display apparatus and the object for which the instruction signal for marking has been input and received by the instruction section,
wherein the specification section specifies the position of the marked object relative to the position of the display apparatus based on the distance measured by the distance measuring section.

7. The display apparatus of claim 1, further comprising:
an identification section to identify the marked object based on the position of the marked object specified by the specification section, and
an information obtaining section to obtain information regarding the marked object identified by the identification section,
wherein the reporting section reports the information regarding the marked object, the information having been obtained by the information obtaining section.

8. The display apparatus of claim 7, further comprising a communication section to communicate with an external information-processing device,
wherein the information obtaining section obtains information regarding the marked object through the communication section.

9. The display apparatus of claim 1, further comprising an ocular section having the display section equipped therein.

10. The display apparatus of claim 9, wherein the display apparatus is cylindrically-shaped and comprises the ocular section on one edge thereof and the instruction section on a lateral side thereof, and
wherein the instruction section is positioned so as to be close to at least one finger of a user holding the display apparatus.

11. A display method for a display apparatus including a display section to display an image sequentially picked up by an image pickup section, the method comprising:
receiving an input of an instruction signal for marking an object, the object being included in the image displayed by the display section and being displayed at a predetermined position of the display section;
specifying a position of the display apparatus,
specifying a pickup direction of the image pickup section;
specifying, in response to the input of the instruction signal, a position of the marked object relative to the position of the display apparatus at a time of the input of the instruction signal, based on the specified position of the display apparatus at the time of the input of the instruction signal, and based on the specified pickup direction at the time of the input of the instruction signal;
measuring an amount of change in the position of the display apparatus and the pickup direction, from the time of the input of the instruction signal, the change being associated with movement of the display apparatus, by comparing (i) a reference position and a reference image pick up direction of the display apparatus to (ii) a current position and a current image pick up direction of the display apparatus;
reporting the position of the marked object having been specified in response to the input of the instruction signal; and
renewing the position of the marked object depending on a result of the measuring the amount of change, and renewing the reporting the position of the marked object depending on the renewed position.

12. A non-transitory computer-readable storage medium that stores a program for causing controlling a computer, which is included in a display apparatus provided with a display section for displaying an image sequentially picked up by an image pickup section, to function as:
an instruction section to generate receive an input of an instruction signal for marking an object, the object being included in the image displayed by the display section and being displayed at a predetermined position of the display section;

a position specification section to specify a position of the display apparatus;

a direction specification section to specify a pickup direction of the image pickup section;

a specification section to specify a position of the marked object relative to the position of the display apparatus at a time of the input of the instruction signal, based on the position of the display apparatus specified by the position specification section at the time of the input of the instruction signal, and based on the pickup direction specified by the direction specification section at the time of the input of the instruction signal, in response to the input of the instruction signal from the instruction section;

an amount-of-change measuring section to measure an amount of change in the position of the display apparatus and the pickup direction, from the time of the input of the instruction signal, the change being associated with movement of the display apparatus, by comparing (i) a reference position and a reference image pick up direction of the display apparatus to (ii) a current position and a current image pick up direction of the display apparatus;

a reporting section to report the position of the marked object in accordance with a specification result of the specification section; and a renewing section to renew the position of the marked object depending on a measurement result of the amount-of-change measuring section, and to renew a report reported by the reporting section depending on the renewed position.

* * * * *

UNITED STATES PATENT AND TRADEMARK OFFICE
CERTIFICATE OF CORRECTION

PATENT NO. : 8,928,584 B2  
APPLICATION NO. : 13/567238  
DATED : January 6, 2015  
INVENTOR(S) : Katsuhiro Nara et al.

Page 1 of 1

It is certified that error appears in the above-identified patent and that said Letters Patent is hereby corrected as shown below:

In the Claims

Column 18, Claim 12, Line 2, after "for" delete "causing".

Column 18, Claim 12, Line 6, after "to" delete "generate".

Signed and Sealed this
Fourteenth Day of July, 2015

Michelle K. Lee
*Director of the United States Patent and Trademark Office*